(12) United States Patent
Markarian et al.

(10) Patent No.: US 11,423,232 B2
(45) Date of Patent: Aug. 23, 2022

(54) SYSTEMS AND METHODS FOR DEPLOYING COMPUTERIZED CONVERSATIONAL AGENTS

(71) Applicant: NFL Enterprises LLC, New York, NY (US)

(72) Inventors: Hagop Markarian, Burbank, CA (US); Claire Halligan, Los Angeles, CA (US); Ian Campbell, Los Angeles, CA (US); Barrett Bradley Edgington, Culver City, CA (US); Daniel Edward Hogan, Los Angeles, CA (US)

(73) Assignee: NFL Enterprises LLC, New York, NY (US)

( * ) Notice: Subject to any disclaimer, the term of this patent is extended or adjusted under 35 U.S.C. 154(b) by 289 days.

(21) Appl. No.: 16/821,826

(22) Filed: Mar. 17, 2020

(65) Prior Publication Data

US 2021/0294976 A1    Sep. 23, 2021

(51) Int. Cl.
| | |
|---|---|
| *G06F 40/30* | (2020.01) |
| *G06F 40/253* | (2020.01) |
| *G06F 40/295* | (2020.01) |
| *G06F 16/33* | (2019.01) |
| *G10L 15/22* | (2006.01) |

(52) U.S. Cl.
CPC .......... *G06F 40/30* (2020.01); *G06F 16/3344* (2019.01); *G06F 40/253* (2020.01); *G06F 40/295* (2020.01); *G10L 15/22* (2013.01)

(58) Field of Classification Search
CPC ....... G10L 15/22; G06F 16/3344; G06F 40/30
See application file for complete search history.

(56) References Cited

U.S. PATENT DOCUMENTS

| 10,229,680 | B1* | 3/2019 | Gillespie ................ G06F 40/295 |
|---|---|---|---|
| 2015/0066479 | A1* | 3/2015 | Pasupalak ......... G06F 16/90332 |
| | | | 704/9 |
| 2018/0233141 | A1* | 8/2018 | Solomon ........... H04N 21/42203 |
| 2018/0307687 | A1* | 10/2018 | Natkin ................ G06F 16/3329 |
| 2020/0081939 | A1* | 3/2020 | Subramaniam ... G06F 16/90332 |
| 2020/0135180 | A1* | 4/2020 | Mukherjee .......... G10L 15/1822 |
| 2020/0279555 | A1* | 9/2020 | Shapiro .................... G10L 15/22 |
| 2021/0294976 | A1* | 9/2021 | Markarian .......... G06F 16/3344 |

* cited by examiner

*Primary Examiner* — Samuel G Neway
(74) *Attorney, Agent, or Firm* — Vinson & Elkins L.L.P.

(57) ABSTRACT

Embodiments of the disclosed technology relate to systems, methods, and computer-readable storage media for deploying a computerized conversational agent. Some embodiments can receive configuration information comprising an intent and a plurality of possible entities corresponding to the intent. Some embodiments can receive a user request comprising a user entity and a user intent. Some embodiments can determine an actual entity from the plurality of possible entities corresponding to the user intent where the actual entity corresponds to the user entity. Some embodiments can provide to the user a fulfillment corresponding to at least the actual entity.

21 Claims, 6 Drawing Sheets

SYSTEMS AND METHODS FOR DEPLOYING COMPUTERIZED CONVERSATIONAL AGENTS

TECHNICAL FIELD

The present application relates to computerized conversational agents, as well as systems and methods for deploying and configuring the same.

BACKGROUND

When looking for answers to questions, users often have voluminous amounts of information at their disposal, available from multiple electronic sources. But a volume of information itself presents considerable challenges, because locating the appropriate source of information, and then accessing the correct answer within that source of information, can frequently be cumbersome. This process requires knowing the approximate contents of each data source, as well as a method for searching that source, which may vary from source to source. Where users are not sophisticated users of such sources of information, otherwise answerable questions may go un-answered because of these challenges.

One potential solution implemented by embodiments of the present technology is to provide an execution plan for questions posed by users that can automate the process of searching disparate sources of electronic information and provide answers to users in a timely manner. That is, many questions asked by users may have similar features, differing in only certain key parameters. Where this is true, embodiments can implement an execution plan to obtain an answer to the question based on the parameters in the question.

As part of this solution, developers can determine question types that are answerable and provide execution plans in accordance with those questions. In such a circumstance, such a developer would need to possess several potentially unrelated skills, including but not limited to (1) the types of questions likely to be asked by users, (2) the sources of information usable to answer the question (3) how to access those sources, and (4) how to format information retrieved from those sources in a user-friendly way, and (5) programming skills to knit together each of these elements into an execution plan. Many of these skills are oriented more towards marketing, customer service, and research, not software development. Thus, spending developer time on producing execution plans can be wasteful and inefficient. To solve this problem, embodiments provide a simplified and user-friendly mechanism to configure and deploy execution plans without needing software development expertise.

SUMMARY

Embodiments of the present disclosed technology relate to a method for deploying a computerized conversational agent, comprising receiving configuration information comprising an intent and a plurality of possible entities corresponding to the intent; receiving a user request comprising a user entity and a user intent; determining an actual entity from the plurality of possible entities corresponding to the user intent where the actual entity corresponds to the user entity; and providing to the user a fulfillment corresponding to at least the actual entity.

In some embodiments, the plurality of possible entities comprise a plurality of subsets of possible entities arranged in a predetermined order, and wherein comparing the user entity to a plurality of possible entities comprises: (a) using a first subset of possible fulfilment entities as a comparison set of possible entities, (b) calculating a similarity score between the user entity and each possible entity in the comparison set of possible entities, (c) if the best similarity score between the user entity and a possible entity in the comparison set of phrases exceeds a threshold, selecting the possible entity from the comparison set of response phrases having the best similarity score as compared to the request phrase, and (d) if the best similarity score between the user entity and a possible entity in the comparison set of possible entities does not exceed a threshold, using the next set of possible entities as a comparison set, and repeating steps (a)-(d).

In some embodiments, comparing the user entity to a plurality of possible entities further comprises prompting the user to provide an additional or a replacement user entity if a maximum similarity between the user entity and the plurality of possible entities is below a threshold. In some embodiments, the plurality of possible entities have a type, wherein the step of receiving further comprises receiving a plurality of previous actual entities associated with a plurality of previous user requests, wherein each of the previous actual entities has a type, and wherein the step of determining an actual entity from the plurality of possible entities further comprises detecting that the user entity is a pronoun, and selecting as the actual entity a most-recently used actual entity from the previous actual entities, where the selected actual entity has the same type as the type of the plurality of possible entities.

In some embodiments, comparing the user entity to a plurality of possible entities comprises calculating a similarity score, wherein the similarity score is calculated using an algorithm that returns a higher score if a subset of characters appearing at the beginning of the string are a closer match, and/or wherein the similarity score is calculated using an algorithm that returns a higher score if a subset of characters appearing at the end of the string are a better match.

In some embodiments, providing to the user a response includes one or more of: text, a multimedia object, or a reference to supplemental related content. In some embodiments, the step of receiving configuration information further comprises providing a graphical user interface to a configuring user, and receiving, by the graphical user interface, an intent configuration comprising an example intent phrase, an entity category comprising the plurality of possible entities corresponding to the intent, a query of a data source containing information relevant to the intent, and a fulfillment of the intent comprising multimedia content retrieved from the data source In some embodiments, the step of receiving, by the graphical user interface, an intent configuration further comprises a reference to supplemental related content associated with the fulfillment.

Aspects of the present disclosed technology also relate to computing systems and non-transitory computer-readable storage media for performing the methods disclosed above.

BRIEF DESCRIPTION OF THE FIGURES

Included in the present specification are figures that illustrate various embodiments of the present disclosed technology. As will be recognized by a person of ordinary skill in the art, actual embodiments of the disclosed technology need not incorporate each and every component illustrated, but may omit components, add additional components, or change the general order and placement of components. Reference will now be made to the accompanying figures and flow diagrams, which are not necessarily drawn to scale, and wherein.

DETAILED DESCRIPTION

The following detailed description is directed to systems, methods, and computer-readable media for detecting and responding to anomalies in a traffic management system.

Although example embodiments of the present disclosure are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

In the following detailed description, references are made to the accompanying drawings that form a part hereof and that show, by way of illustration, specific embodiments or examples. In referring to the drawings, like numerals represent like elements throughout the several figures.

Various products and services provided by third parties are mentioned as example components of embodiments in accordance with the disclosed technologies. The use of trademarked (registered or common-law) names are intended for descriptive purposes only—no claim of ownership over the terms is asserted by the applicants. Further, the mention of a trademarked product or service is as an example only. Other products and services providing equivalent functions, whether commercial, open-source, or custom-developed to support embodiments are contemplated in accordance with the disclosed technology.

Figure 1:
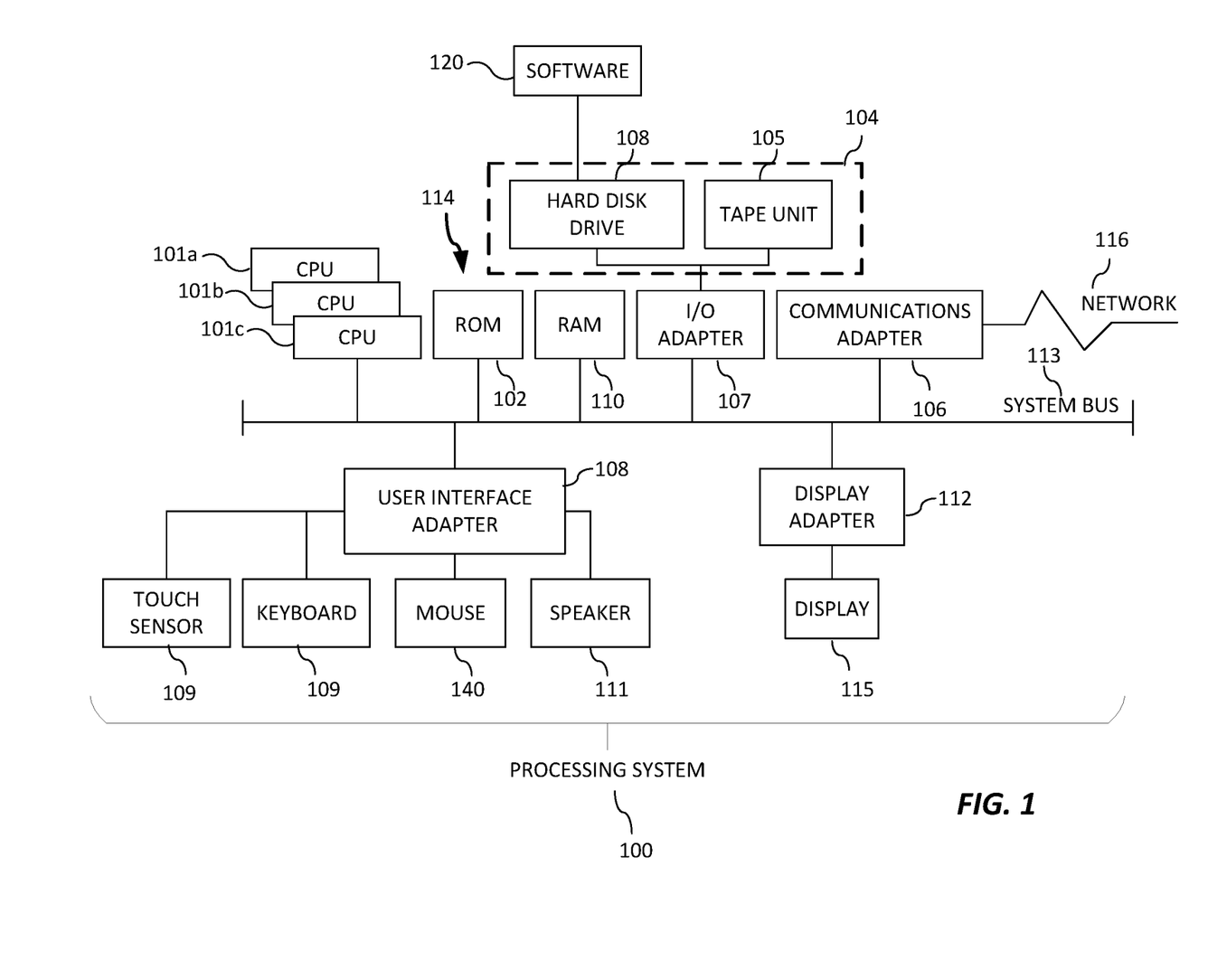
FIG. 1 depicts a computing device in accordance with an embodiment.

Referring now to FIG. 1, there is shown an embodiment of a processing system 100 for implementing the teachings herein. In this embodiment, the processing system 100 has one or more central processing units (processors) 101a, 101b, 101c, etc. (collectively or generically referred to as processor(s) 101). Processors 101, also referred to as processing circuits, are coupled to system memory 114 and various other components via a system bus 113. Read only memory (ROM) 102 is coupled to system bus 113 and may include a basic input/output system (BIOS), which controls certain basic functions of the processing system 100. The system memory 114 can include ROM 102 and random access memory (RAM) 110, which is read-write memory coupled to system bus 113 for use by processors 101.

FIG. 1 further depicts an input/output (I/O) adapter 107 and a network adapter 106 coupled to the system bus 113. I/O adapter 107 may be a small computer system interface (SCSI) adapter that communicates with a hard disk (magnetic, solid state, or other kind of hard disk) 103 and/or tape storage drive 105 or any other similar component. I/O adapter 107, hard disk 103, and tape storage drive 105 are collectively referred to herein as mass storage 104. Software 120 for execution on processing system 100 may be stored in mass storage 104. The mass storage 104 is an example of a tangible storage medium readable by the processors 101, where the software 120 is stored as instructions for execution by the processors 101 to implement a circuit and/or to perform a method. Network/communications adapter 106 interconnects system bus 113 with an outside network 116 enabling processing system 100 to communicate with other such systems. A screen (e.g., a display monitor) 115 is connected to system bus 113 by display adapter 112, which may include a graphics controller to improve the performance of graphics intensive applications and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 140, and speaker 111 can be interconnected to system bus 113 via user interface adapter 108, which may include, for example, a Super I/O chip integrating multiple device adapters into a single integrated circuit.

Thus, as configured in FIG. 1, processing system 100 includes processing capability in the form of processors 101, and, storage capability including system memory 114 and mass storage 104, input means such as a keyboard 109, mouse 140, or touch sensor 115 (including touch sensors 109 incorporated into displays 115), and output capability including speaker 111 and display 115. In one embodiment, a portion of system memory 114 and mass storage 104 collectively store an operating system to coordinate the functions of the various components shown in FIG. 1.

Figure 2:
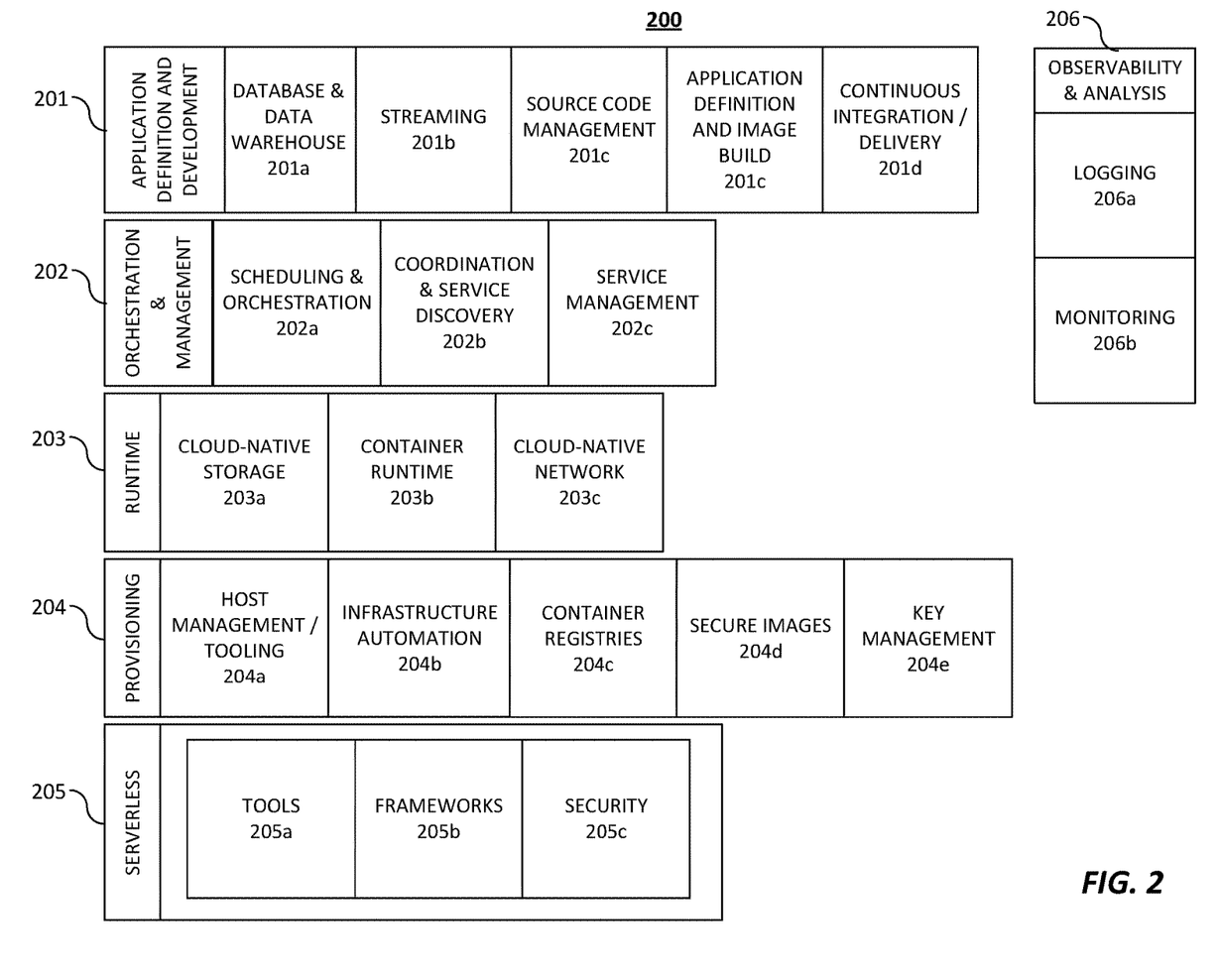
FIG. 2 depicts a cloud computing environment in accordance with an embodiment.

Embodiments of the present technology can also be implemented using cloud-based technologies, such as those depicted in FIG. 2. Cloud native technologies include scalable applications in modern, dynamic environments such as public, private, and hybrid clouds. Containers, service meshes, microservices, immutable infrastructure, and declarative APIs exemplify this approach. These techniques enable loosely coupled systems that are resilient, manageable, and observable.

Embodiments of the disclosed technology can be built using one or more elements of cloud computing technology as shown in FIG. 2. Cloud technologies can include application definition and development tools 201, orchestration & management tools 202, runtime tools 203, provisioning tools 204, serverless components 205, and observability & analysis tools 206.

Application definition and development components 201 ("ADD") enable developers to define and develop applications prior to deployment, and to refine those designs in subsequent versions. ADD components 201 can include database and data warehouse components 201a that provide data sets and data storage for application development. These database and data warehouse components 201a include relational and non-relational data stores, graph databases, flat files, and other data storage technologies. ADD components 201 can further include streaming components 201b that facilitate rapid distribution of data to numerous system endpoints, such as message queues, stream processing software, and other data distribution systems. ADD components 201 can further include source code management components 201c, such as Git, Mercurial, Subversion, and other similar source management systems. Source code management components 201c can also include cloud-based servers for version control, such as GitHub or GitLab. ADD components 201 can further include application definition and image build components 201c that allow developers to define cloud-based infrastructure, including configurations of application servers, software defined networks, and containerized services. ADD components 201 can further include continuous integration and continuous delivery (CI/CD) components 201d that automate the process of application testing and deployment. CI/CD components 201d can be configured to automatically run automated tests on application software (e.g., when a change is committed to a version control platform), and if the tests are successful, to deploy the application software to a production environment.

Orchestration and management ("OM") components 202 facilitate the containerization and subsequent coordinated execution of application software. OM components 202 include scheduling and orchestration components 202a that schedule and run containerized software. Non-limiting examples of scheduling and orchestration components 202a include Kubernetes and Docker Swarm. OM components 202 can further include coordination and service discovery components 202b that allow software to automatically discover cloud-based resources, such as data stores, data streaming sources, etc. OM components can further include service management components 202c that can include load balancers, reverse proxy systems, auto scalers, and other components that facilitate autonomous or manual application scaling.

Runtime components 203 can include basic environments to support execution of cloud-based application software. Runtime components 203 can include cloud-native storage 203a, such as object stores, virtual file systems, block storage, and other forms of cloud-centric data storage. Runtime components 203 can include container runtimes 203b that provide the foundation for containerized application software, such as Docker or Rkt. Runtime components 203 can further include cloud-native network components 203c that provide software-defined networking and virtual private cloud technologies that enable components of cloud-based systems to communicate with each other, as well as with the wider Internet.

Provisioning components 204 can include components intended for configuring cloud components and triggering the creation of cloud resources on various cloud platforms. Provisioning components can include Host Management and Tooling components 204a that define and deploy configurations of cloud components when executed. Provisioning components 204 can further include infrastructure automation components 204b that automate basic cloud infrastructure tasks. Provisioning components 204 can further include container registries 204c that provide storage for containerized cloud applications that are deployable by other provisioning components. Provisioning components can further include secure image components 204d that provide security and verification for container images to ensure consistent and reliable deployment of trusted container images. Provisioning components can further include key management systems 204e that provide for secure storage of cryptographic keys.

Serverless components 205 can include components for deploying cloud applications that do not rely upon a continuously-running (or scheduled) runtime execution, but instead run discrete components of functionality given a condition. Serverless components 205 can include components 205a to simplify the development of serverless applications, such as components that convert server-centric software into serverless code, event simulators, and simulations of cloud-based serverless platforms. Serverless components 205 can also include frameworks 205b that are predefined systems that take code in certain configurations and deploy them as serverless applications in cloud environments. Serverless components 205 can also include security components 205c that help to secure serverless applications.

Observability & Analysis components ("O&A") 206 can include systems for monitoring running cloud applications, detecting and observing defects and errors, and logging system performance. O&A components 206 can include monitoring components 206a that monitor running systems to display and/or record performance metrics, error rates, and other application data. O&A components 206 can also include logging components 206b that collect system logs from cloud-based components and aggregate them in a single place or to a single access point to review system performance. O&A components 206 can also include tracing components 206c that collect detailed trace logs when cloud components run into errors, system exceptions, and other problematic behaviors to assist in the identification and remediation of problems in cloud-based systems.

In some embodiments, one or more methods are embodied in a set of instructions for one or more processors having access to one or more types of memory. The instructions could be coded in hardware or in software. Many kinds of platforms may be used, including, but not limited to: computers, mobile devices, tablets, game consoles, network management devices, field-programmable gate arrays, and cloud-based computer systems. Aspects of the disclosure could be deployed on multiple devices for concurrent operation. Embodiments may be used as a component of a larger system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In some embodiments, the computer readable medium can be a non-transitory storage system on a cloud platform, such as, for example, in a database or data warehouse component 201a, a source code management tool 201c, cloud-native storage component 203a, embodied in a container image stored locally or in a container registry 204c, or deployed in a container runtime 203b. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including, but not limited to wireless, wireline, optical fiber cable, RF, etc., or any suitable combination of the foregoing.

Computer program code for carrying out operations for aspects of the present invention may be written in any combination of one or more programming languages, including languages such as Java, Python, Go, Ruby, Javascript, Smalltalk, C++ or the like. As defined herein, computer program code also includes the build artifact of any of the above languages, or similar languages and environments, such as object code, byte- or word-code, or other compiled, interpreted, or processed code. The program code may execute entirely on the user's computer, partly on the user's computer, as a stand-alone software package, partly on the user's computer and partly on a remote computer or entirely on one or more remote computers, servers, or serverless cloud platforms. In the latter scenario, the remote computer may be connected to the user's computer through any type of network, including a local area network (LAN) or a wide area network (WAN), or the connection may be made to an external computer (e.g., through the Internet using an Internet Service Provider).

Aspects of embodiments of the present invention that are described above with reference to flowchart illustrations and/or block diagrams of methods, apparatus (systems) and computer program products according to embodiments of the invention. The flowchart and/or block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The disclosed technology is disclosed in terms of modules and submodules, each of which are to be understood as discrete units of functionality, which can be embodied as classes, modules, functions, compilation or build artifacts, or other components of one or more programming languages used to implement embodiments of the disclosed technology. While the present description illustrates one organization of the various modules and submodules for implementing embodiments of the disclosed technology, the invention is not so limited. Embodiments of the presently disclosed technology can include other organizations for implementing equivalent or overlapping functionality for the various modules described herein, such as by sharing functionality between modules, combining modules, separating modules into multiple modules, implementing class hierarchies and the like. Additionally, the accompanying drawings illustrate example relationships between various modules and submodules (such as by flowchart connectors or inclusion of modules as sub-modules of other modules), but these relationships are not limiting. As would be recognized by a person of ordinary skill in the art, the output of any given module is available to be included as part of the input of any other component in accordance with various embodiments. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatuses, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described herein were chosen and described in order to best explain the principles of the invention and the practical application, and to enable others of ordinary skill in the art to understand the invention for various embodiments with various modifications as are suited to the particular use contemplated.

Figure 3:
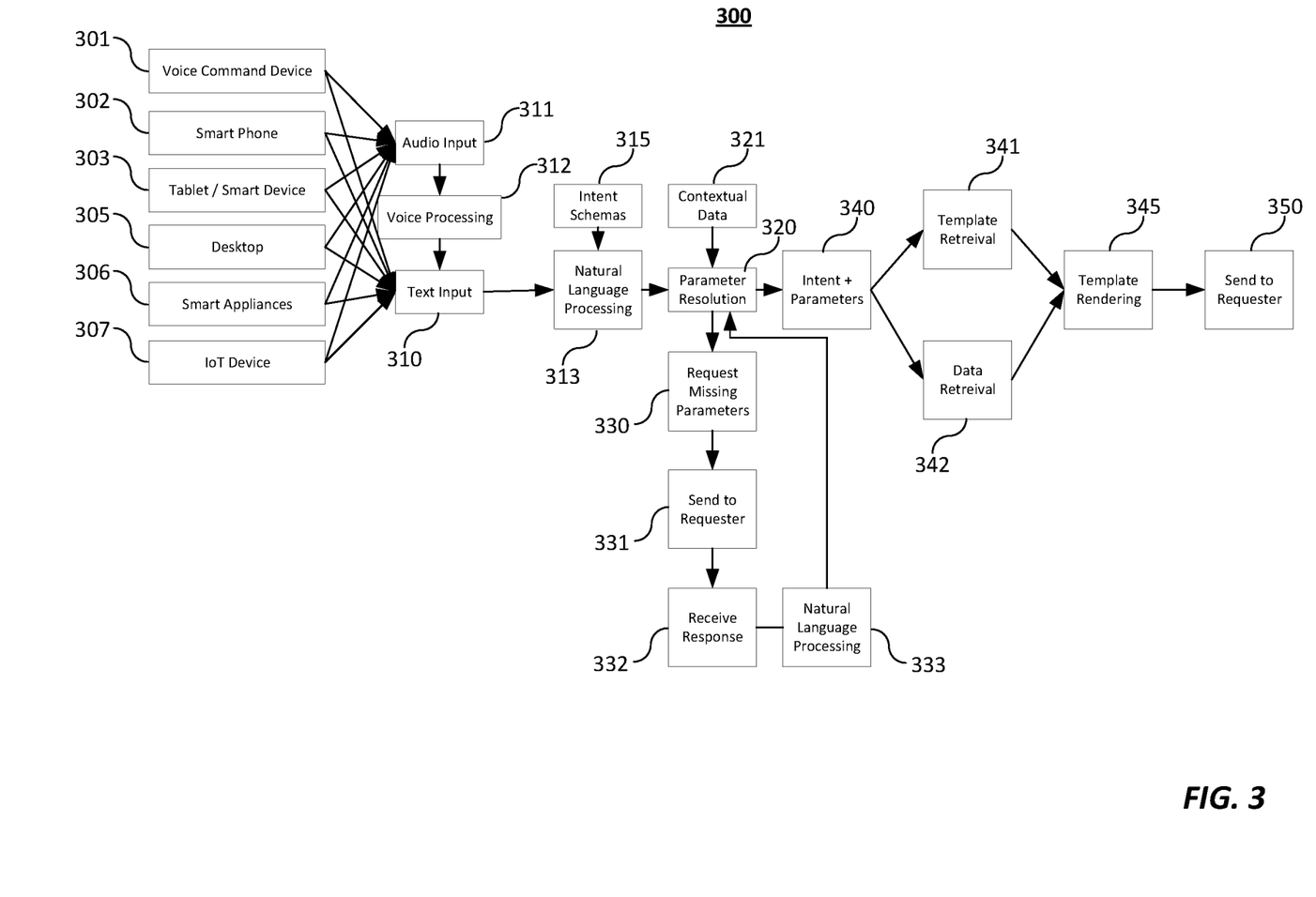
FIG. 3 depicts a system architecture in accordance with an embodiment.

FIG. 3 illustrates a system architecture for responding to user's questions in accordance with an embodiment. A question from a user can be received through a device, such as a voice command device 301 (e.g. Amazon Alexa, Google Home, Apple HomePod), smart phone 302, tablet or smart device 303, a desktop computer 305, smart appliances 306, or internet-of-things devices 307. These devices for receiving questions from a user are provided by way of example, but any device capable of receiving audio or text input from a user, and providing textual or auditory responses to a user are contemplated by the disclosed technology. Such devices 301-307 receive a question from a user in either text format 311, such as a typed textual question, or audio format 311, such as a sound recording of a question spoken by the user. Where the question is received as audio input 311, voice processing 312, as is known in the art, can be performed on the question to convert the spoken question into a textual format to produce text input 310 for further processing.

Once a user's question has been reduced to textual input 311, a natural language processing module 311 can be performed on the text input to match an intent to the user's question, and to parse any question parameters present in the user's question. In some embodiments, this process can proceed in two steps. First, the natural language processing module 311 can compare the text input to a plurality of possible intents, represented here as intent schemas 315, and determine the intended question of the user, that is, the intent represented by the text input 310. For example, the system may compare the textual input to a set of possible intents, and rank them based on the likelihood that the input corresponds to that intent. This can be done using a variety of machine learning techniques, for example, word or document embedding, clustering, TF-IDF rankings, and other similar techniques. Once the intent schema 315 is located, the system is aware of what intent parameters are necessary to return a result from that intent.

Second, the natural language processing module 313 can attempt to locate intent parameters within the text input 311. The detection of intent parameters can be performed in several ways, including but not limited to positional detection, or textual detection. In positional detection, parameters are detected based on the actual or grammatical location of the parameter in the sentence. For example, if the intent schema is "When is the next {TEAM} game?," and a user asks the question "When is the next Houston Texans game?" the system can detect that the parameter TEAM is "Houston Texans'" based on its actual position (between "next" and "game), or its grammatical position, as an adjectival phrase describing the "next game."

In textual detection, using the same example, the natural language processing module 313 can infer that an expected parameter is a team name, and that there are a limited number of team names. The user's question can be scanned, looking for phrases that match known parameters, such as "Houston Texans," "New England Patriots," and so on. In some embodiments, the search can be a "fuzzy" search, looking for close, rather than exact matches. Examples of such fuzzy searching can be case-insensitive searches, or searches based on distance metrics between the phrase and a list of known parameters. Examples of such distance metrics include Levenshtein distance, longest common subsequence, hamming distance, Damerau-Levenshtein distance, Jaro-Winkler distance, and other distance metrics as are known in the art. The parameter can thus be identified as the known parameter with the lowest edit distance from the phrase in the user's question.

In some embodiments, a plurality of terms can correspond to a list of known parameters. For example, if the known parameter is football teams, the parameter "Houston Texans" could be present in a user's question as "Houston," or "Texans," both of which would correspond to the "Houston Texans." Likewise, personal names can have multiple terms, all corresponding to the same person. For example, the football player JJ Watt could be "JJ," "Watt," or even more complex terms, like "Houston's Defensive End," (which is highly likely to refer to JJ Watt given his popularity, even among other defensive ends). These terms can be compared to phrases in the user's question to identify a parameter. If the term is located, then the corresponding known parameter will be selected as the parameter.

In some embodiments, terms associated with various known parameters can be organized hierarchically between various levels. For example, if the parameter is NFL players, level 1 can be player's full names, level 2 can be player's last names, level 3 can be player's first names. Other corresponding terms could be used, and the order of levels can be adjusted without departing from the scope of the disclosed technology. When comparing phrases in the user's question to search terms, the system can first compare the phrase to all terms in level 1. If a sufficiently close match is identified (as measured by a distance metric), then the parameter corresponding to the term is selected. Otherwise, the system proceeds to the next level, and repeats the process until a term is identified that matches the phrase. If no sufficiently close match is identified, the phrase can be rejected as not corresponding to a parameter.

In some embodiments, a tree match technique can be used. In this technique, possible values are arranged hierarchically. The tree is traversed (depth first search) to find out the closest node that matches the user input, and then traverse from that node to the leaves to select valid input into the data retrieval services. For example, for geographical queries, if someone said "Which team plays in Inglewood", Inglewood would be a parent node to Los Angeles (the leaf node), so we would take the user input "Inglewood", traverse the tree to find that node, then from that node, travel down to the leaf, and use that leaf node value (Los Angeles) in the query. As a second example, if someone said "which teams play in California", California would match an ancestor node to the leaves that represent Los Angeles, Oakland, and San Francisco, each of which are valid resolved intents.

Once any parameters have been identified in the user's question, the natural language processing module 313 passes the identified intent and identified parameters to a parameter resolution module 320. The parameter resolution module 320 can identify all parameters needed by the corresponding intent, including those not present in the user's question. Such missing parameters can be inferred from contextual data 321. Such contextual data can include data about the user, data about the device that received the question, or global context such as news headlines and events.

In some embodiments, the parameter resolution module 320 can obtain parameters from user information. Examples of user information can include location information, preference information, or other information related to a user. For example, if a user asks "when is the next home game?" the parameter resolution module 320 can resolve a team parameter as the user's favorite team, or the team associated with the user's location.

In some embodiments, the parameter resolution module 320 can obtain parameters from global context, such as current news events, schedules, scores, or other information. For example, if a user asks "Who won the big upset last night?," and there are recent news stories about a major upset, the parameter resolution module can match that question to the news stories.

In some embodiments, a popularity match, or other similar heuristic, can be used. For example, if the user input is "How many rushing yards did Emmitt Smith have in his career?", Emmitt Smith is the selected user input. However, there are several players in the history of the NFL with the name "Emmitt Smith," and thus the query needs to be further resolved to the specific Emmitt Smith referred to. Examples of such heuristics can include, for example, choosing the player with the largest number of active seasons, the player most frequently selected in the application, or in other websites or applications, or other similar techniques to disambiguate the result.

In some embodiments, the parameter resolution module 320 can reduce a phrase referring to a period of time to a discrete date or range of dates. For example, the term "this season", could be resolved to the present year, or "next off season" can refer to the summer months of the next year.

In some embodiments, the parameter resolution module 320 can obtain parameters from history information, such as prior questions, prior answers, or other information obtained from a conversation with the user. For example, if a user asks "When is the Atlanta Falcons' next game?," and then subsequently asks, "Who is their starting quarterback?" the parameter resolution module 320 can identify that no team is named in the second question, but that the last team the user asked about is the Atlanta Falcons. Accordingly, the parameter resolution module 320 can infer that the missing team parameter is the Atlanta Falcons. Contextual data can also come from prior answers. In the prior example, if the user's first question was "What is the name of Atlanta's football team?," then the team could be inferred based on the prior answer—the Atlanta Falcons.

In some embodiments, if the parameter resolution module 320 cannot identify all parameters in the corresponding intent, it can issue a request for the missing parameters 330, which will be returned to the requester 331. In response module 332, the incoming response is converted to a textual input (if not already in text form) in a similar manner as the question received from user device 301-307. A natural language processing module 333 similar to natural language processing module 313 can also be used to retrieve the missing parameter from the user's response in a similar manner as was obtained from the original question by natural language processing module 313. The parameters retrieved from the user's response 332 can be incorporated into the parameter resolution module 320's parameters.

Once the parameter resolution module 320 has resolved all necessary parameters for a given intent, the intent and resolved parameters are then used by a template retrieval module 341 to retrieve a template associated with the intent, and a data retrieval module 342 to retrieve response data associated with the intent and the resolved parameters. In the template retrieval module 341, each intent can have a plurality of templates associated with it. For example, for a given intent, different templates can be associated with the type of device 301-307, input type (audio 311 or text input 310), or the application program running on the device 301-307. Such templates can also exist in a plurality of forms, such as plain text, HTML, XML, or other similar formats. In this manner, a template that returns the appropriate type of response for the device, application, and the type of request can be returned.

One or more data items associated with the intent can also be retrieved and/or calculated by a data retrieval module 342. The data retrieval module 342 can retrieve data from external source associated with the intent and parameters. For example, if the question is "How many touchdown passes did Aaron Rogers throw last year," and the natural language processing module 313 and parameter resolution module 320 resolved the intent to a "number of touchdown passes" intent, and a parameter of "Aaron Rogers," the data retrieval module can be configured to retrieve the number of touchdown passes for a player, substitute in the parameter "Aaron Rogers," and query a statistics database to produce an answer. In some embodiments, the data retrieval module 342 can retrieve information from a plurality of sources and/or perform data transformations in order to produce data responsive to the user's question. For example, if the statistics database queried in the example above does not keep data on an annual basis, the data retrieval module 342 can retrieve the number of touchdown passes within a data range, and calculate a sum of those touchdown passes.

Once the data retrieval module 342 has retrieved that data responsive to the user's request, and the template retrieval module 341 has retrieved the appropriate template, the template can be rendered by the template rendering module 345. The template rendering module 345 can populate the retrieved template with the retrieved data. In some embodiments, additional rendering steps can be performed. For example, if it would be appropriate to return audio output, the template rendering module 345 can populate a voice script template with data, and then execute a text-to-speech conversion to convert the script into an audio file. As another example, if the template includes pictures or other graphical content, the rendering module 345 can perform transformations to that content as part of rendering the template, such as cropping, resizing, format conversion, etc. Once the response is rendered, it is sent back to the requesting device 350.

Figure 4:
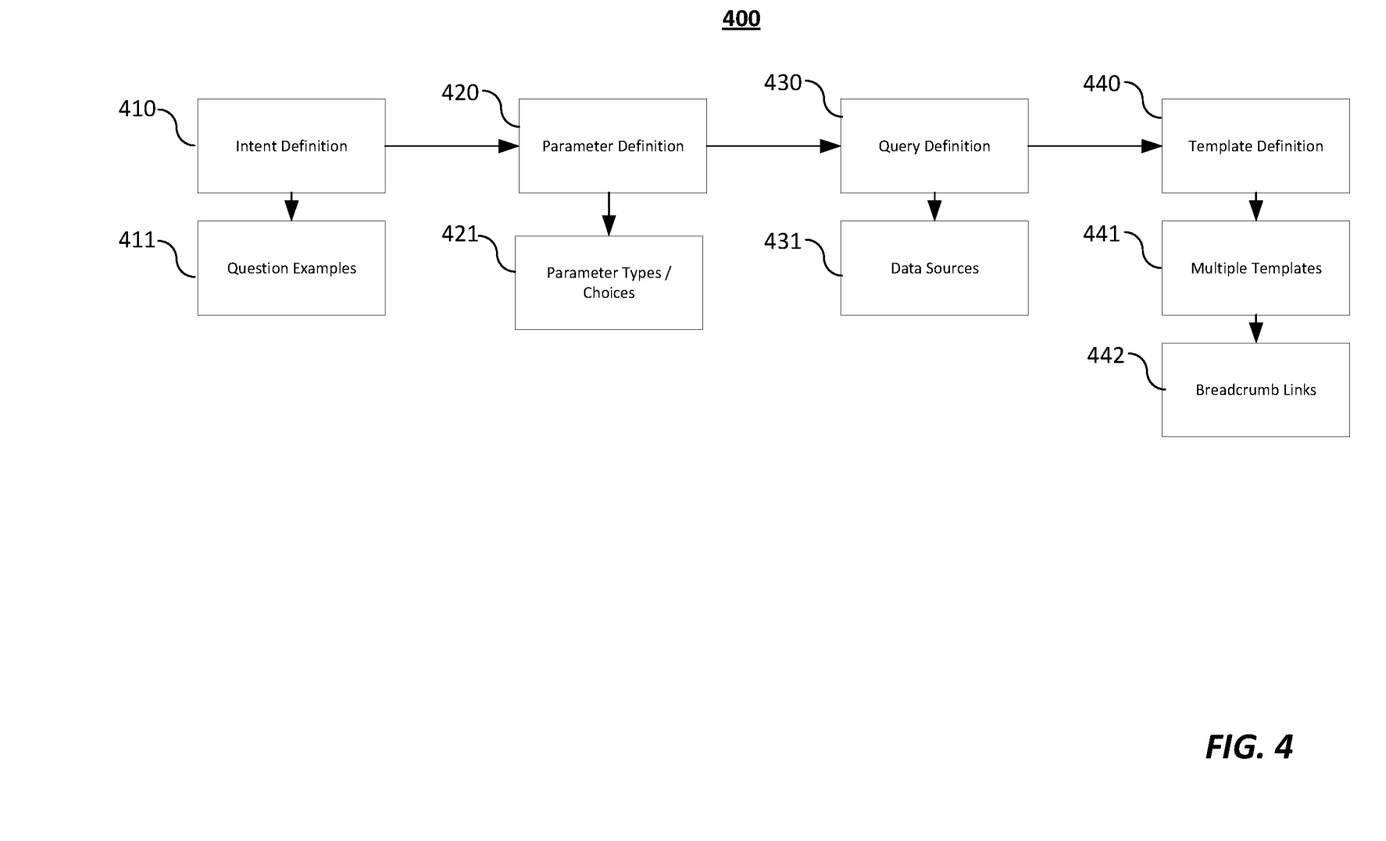
FIG. 4 depicts a system architecture in accordance with an embodiment.

Aspects of the disclosed technology also include methods and systems for producing intents, templates, data queries, and/or other output data to respond to user questions. FIG. 4 depicts a content management system 400 useful for configuring intent information in accordance with an embodiment. In some embodiments, responding to a user's question requires resolving an intent, resolving parameters, executing data queries, and retrieving templates. The content management system 400 provides a mechanism for configuring such data.

An intent designer can first define an intent 410 by, for example, configuring question phrasing 411 to provide examples of potential questions corresponding to that intent. Such examples of questions can include multiple examples of asking the same question using different word choices and sentence structure, such as "When do the gates at Reliant Stadium open?" or "When can I get to my seat at Reliant Stadium?," or "How early can I arrive at Reliant Stadium?" In some embodiments, the question phrasing 411 can include examples that include parameter data, such as "When do the gates at Lambau field open?" In some embodiments, the question phrasing 411 can include examples with parameter placeholders, such as "When do the gates at {STADIUM} open?"

An intent designer can then configure how parameters are to be defined 420. This can include identifying which parameters are necessary in order to retrieve a response. For example, if an example question for an intent is "How many times has Dak Prescott completed a pass to Amari Cooper?" then the parameters can be a Player1 and Player2. In some embodiments, the designer can configure a type or list of choices 421 for each parameter. For example, the system in accordance with an embodiment can include a typing system, whereby various types have constraints on possible values. For example, a "year" could only be a four-digit number within an acceptable range, or a "player" type could be constrained to a list of all possible players. In some embodiments, types can be hierarchical. For example, "Dak Prescott" can be of type player, and also of type "active player", "quarterback", and "starter." In such embodiments, by assigning a parameter a type, the list of potential values can be constrained. In some embodiments, a parameter is given a list of possible choices. For example, a parameter may be a period of time, constrained to the values "last week," "last year," or "all time."

In some embodiments, a designer can also configure and define queries 430 to obtain information necessary to respond to question from a plurality of data sources 431. Data sources 431 can take a variety of forms, including full text search engines, SQL engines, REST API's, among others. The designer selects which sources of information should be queried, and how that information should be queried. This will often include query templates that take identified parameters. For example, if a team's schedule is available through a REST API, a query template can include a GET request to https://schedule.com/api/teams/{TEAM}/next_game. When the intent is triggered, the {TEAM} will be substituted for the team name to retrieve the appropriate schedule.

In some embodiments, a designer can also configure one or more templates 440 to correspond to an intent. Multiple templates 441 can be configured for a single intent. Such templates, as discussed above, can take a variety of forms, and can correspond to a type of response requested, user device, or application running on a user's device. In some embodiments, the templates can further include breadcrumb links 442 can that can connect to external content, or other intents with pre-populated parameters.

Figure 5:
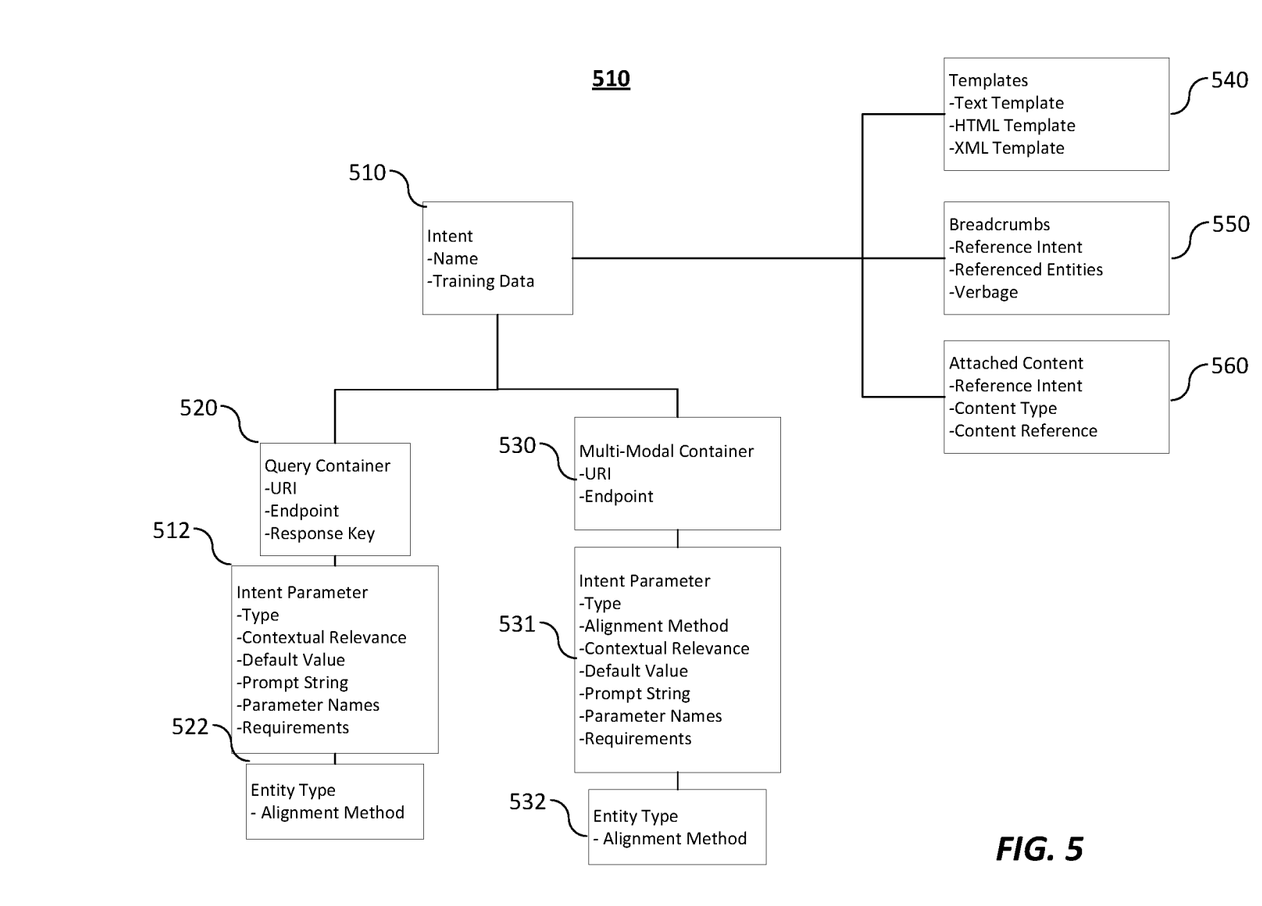
FIG. 5 depicts a data model for an intent in accordance with an embodiment.

FIG. 5 depicts a data model for an intent in accordance with an embodiment. The intent 510 can have a name and training data, such as a list of example queries or questions corresponding to that intent. The intent can also have data retrieval elements, such as one or more query containers 520. In some embodiments, a query container 520 can comprise one or more of a URI, endpoint, and response key. The query container 520 can also include one or more intent variables or parameters 512. The intent parameters 512 can comprise one or more of a type, contextual relevance, default value, prompt string (to ask the user for missing parameters), a parameter name, and one or more requirements. Each intent parameter 512 can further comprise one or more entity types 522, which may include an alignment method. The intent 510 can also have one or more multimodal containers 530. Each multimodal container can comprise one or more intent parameters 531, comprising the same elements as an intent parameter 512 related to a query container 520. For example, a multi-modal container, expressed in JSON format, may look like this:

```
{
    "type": "highlight video",
    "title": "Check out this highlight",
    "asset": {
        "url": "https://cdn.somewebsite.com/highlight.ogg",
        "duration": "2:25"
    }
}
```

The intent 510 can also comprise data structures related to output generation, such as one or more templates 540, one or more breadcrumbs 550, and one or more items of attached content 560. The templates 540 can include plaintext templates, HTML templates, XML templates, and other similar templates. In some embodiments, the XML templates can comprise Simple Speech Markup Language (SSML) templates for conversion by text-to-speech applications into an audio file. The breadcrumbs 550 can include items that may be of interest to a user that are related to the asked question. Breadcrumbs 550 can comprise one or more of a reference intent, referenced entities, and/or related textual matter/verbiage related to the breadcrumb.

The intent 510 can also include attached content 560. The attached content can be media assets or other similar items that are related to the question asked by the user. The attached content 650 can include one or more of a reference intent, content type, or content reference.

Figure 6:
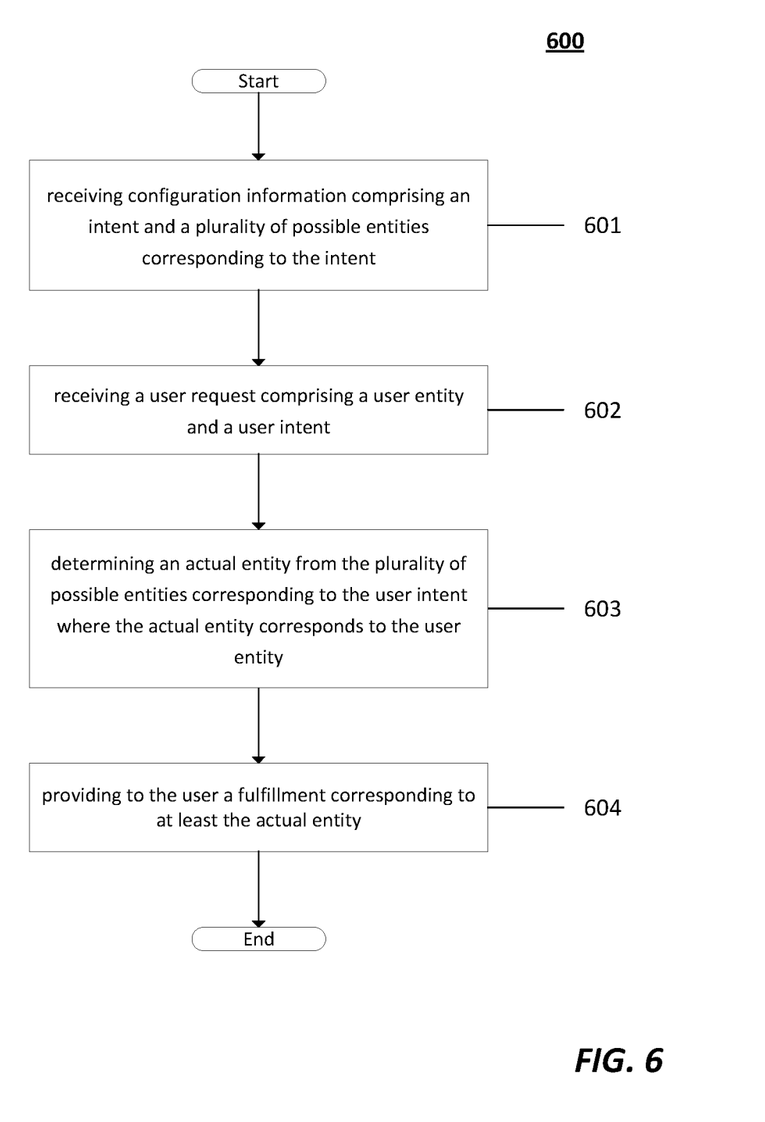
FIG. 6 depicts a method in accordance with an embodiment.

FIG. 6 depicts a method 600 for deploying a computerized conversational agent in accordance with an embodiment. In some embodiments, the method comprises receiving configuration information comprising an intent and a plurality of possible entities corresponding to the intent 601. In some embodiments, the method comprises receiving a user request comprising a user entity and a user intent 602. In some embodiments, the method comprises determining an actual entity from the plurality of possible entities corresponding to the user intent where the actual entity corresponds to the user entity 603. In some embodiments, the method comprises providing to the user a fulfillment corresponding to at least the actual entity.

The flowchart and/or block diagrams in the Figures illustrate the architecture, functionality, and operation of possible implementations of systems, methods and computer program products according to various embodiments of the present disclosed technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosed technology have been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the disclosed technology and the practical application, and to enable others of ordinary skill in the art to understand the disclosed technology for various embodiments with various modifications as are suited to the particular use contemplated.

Any flow diagrams depicted herein show just one example. There may be many variations to this diagram or the steps (or operations) described therein without departing from the spirit of the disclosed technology. For instance, the steps may be performed in a differing order or steps may be added, deleted or modified. All of these variations are considered a part of the claimed disclosed technology.

While the preferred embodiment to the disclosed technology had been described, it will be understood that those skilled in the art, both now and in the future, may make various improvements and enhancements which fall within the scope of the claims which follow. These claims should be construed to maintain the proper protection for the invention first described.

What is claimed is:

1. A method for deploying a computerized conversational agent, the method comprising:
   receiving configuration information comprising an intent and a plurality of possible entities corresponding to the intent;
   receiving a user request comprising a user entity and a user intent;
   determining an actual entity from the plurality of possible entities corresponding to the user intent where the actual entity corresponds to the user entity;
   providing to the user a fulfillment corresponding to at least the actual entity;
   wherein the plurality of possible entities comprise a plurality of subsets of possible entities arranged in a predetermined order; and
   wherein the step of determining the actual entity from the plurality of possible entities further comprises comparing the user entity to a plurality of possible entities, further comprising:
   (a) using a first subset of possible fulfilment entities as a comparison set of possible entities;
   (b) calculating a similarity score between the user entity and each possible entity in the comparison set of possible entities;
   (c) if the similarity score between the user entity and a possible entity in the comparison set of phrases exceeds a threshold, selecting the possible entity from the comparison set of response phrases having the best similarity score as compared to the request phrase; and
   (d) if the similarity score between the user entity and a possible entity in the comparison set of possible entities does not exceed the threshold, using the next set of possible entities as the comparison set of possible entities, and repeating steps (b)-(d).

2. The method of Claim 1, wherein the step of comparing the user entity to the plurality of possible entities further comprises:
   prompting the user to provide an additional or a replacement user entity if a maximum similarity between the user entity and the plurality of possible entities is below a threshold.

3. The method of claim 1, wherein the plurality of possible entities have a type, wherein the step of receiving configuration information further comprises receiving a plurality of previous actual entities associated with a plurality of previous user requests, wherein each of the previous actual entities has a type, and wherein the step of determining an actual entity from the plurality of possible entities further comprises:
   detecting that the user entity is a pronoun, and
   selecting as the actual entity a most-recently used actual entity from the previous actual entities, where the selected actual entity has the same type as the type of the plurality of possible entities.

4. The method of claim 1, wherein the step of comparing the user entity to a plurality of possible entities further comprises calculating a similarity score, wherein the similarity score is calculated using at least one of a first algorithm that respectively increases the similarity score if an initial portion of the user entity and each possible entity match, and a second algorithm that respectively increases the similarity score if a terminal portion of the user entity and each possible entity match.

5. The method of claim 1, wherein the fulfillment includes one or more of: text, a multimedia object, or a reference to supplemental related content.

6. The method of claim 1, wherein the step of receiving configuration information further comprises:
   providing a graphical user interface to a configuring user, and
   receiving, by the graphical user interface, an intent configuration comprising an example intent phrase, an entity category comprising the plurality of possible entities corresponding to the intent, a query of a data source containing information relevant to the intent, and a fulfillment of the intent comprising multimedia content retrieved from the data source.

7. The method of Claim 6, wherein the step of receiving, by the graphical user interface, the intent configuration further comprises receiving a reference to supplemental related content associated with the fulfillment.

8. A computing system for deploying an automatic conversational agent, the system comprising:
   one or more memories having computer readable computer instructions; and
   one or more processors for executing the computer readable computer instructions to perform a method comprising:

receiving configuration information comprising an intent and a plurality of possible entities corresponding to the intent;

receiving a user request comprising a user entity and a user intent;

determining an actual entity from the plurality of possible entities corresponding to the user intent where the actual entity corresponds to the user entity;

providing to the user a fulfillment corresponding to at least the actual entity;

wherein the plurality of possible entities comprise a plurality of subsets of possible entities arranged in a predetermined order; and wherein the step of determining the actual entity from the plurality of possible entities further comprises comparing the user entity to a plurality of possible entities, further comprising:

(a) using a first subset of possible fulfilment entities as a comparison set of possible entities;

(b) calculating a similarity score between the user entity and each possible entity in the comparison set of possible entities;

(c) if the similarity score between the user entity and a possible entity in the comparison set of phrases exceeds a threshold, selecting the possible entity from the comparison set of response phrases having the best similarity score as compared to the request phrase; and (d) if the similarity score between the user entity and a possible entity in the comparison set of possible entities does not exceed the threshold, using the next set of possible entities as the comparison set of possible entities, and repeating steps (b)-(d).

9. The system of claim 8, wherein the step of comparing the user entity to the plurality of possible entities further comprises:

prompting the user to provide an additional or a replacement user entity if a maximum similarity between the user entity and the plurality of possible entities is below a threshold.

10. The system of claim 8, wherein the plurality of possible entities have a type, wherein the step of receiving configuration information further comprises receiving a plurality of previous actual entities associated with a plurality of previous user requests, wherein each of the previous actual entities has a type, and wherein the step of determining an actual entity from the plurality of possible entities further comprises:

detecting that the user entity is a pronoun, and selecting as the actual entity a most-recently used actual entity from the previous actual entities, where the selected actual entity has the same type as the type of the plurality of possible entities.

11. The system of claim 8, wherein the step of comparing the user entity to a plurality of possible entities further comprises calculating a similarity score, wherein the similarity score is calculated using at least one of a first algorithm that respectively increases the similarity score if an initial portion of the user entity and each possible entity match, and a second algorithm that respectively increases the similarity score if a terminal portion of the user entity and each possible entity match.

12. The system of claim 8, wherein the fulfillment includes one or more of: text, a multimedia object, or a reference to supplemental related content.

13. The system of claim 8, wherein the step of receiving configuration information further comprises:

providing a graphical user interface to a configuring user, and receiving, by the graphical user interface, an intent configuration comprising an example intent phrase, an entity category comprising the plurality of possible entities corresponding to the intent, a query of a data source containing information relevant to the intent, and a fulfillment of the intent comprising multimedia content retrieved from the data source.

14. The system of claim 13, wherein the step of receiving, by the graphical user interface, the intent configuration further comprises receiving a reference to supplemental related content associated with the fulfillment.

15. One or more non-transitory computer-readable storage media containing machine-readable computer instructions that, when executed by a computing system, performs a method for deploying an automatic conversational agent, the method comprising the steps of:

receiving configuration information comprising an intent and a plurality of possible entities corresponding to the intent;

receiving a user request comprising a user entity and a user intent;

determining an actual entity from the plurality of possible entities corresponding to the user intent where the actual entity corresponds to the user entity;

providing to the user a fulfillment corresponding to at least the actual entity;

wherein the plurality of possible entities comprise a plurality of subsets of possible entities arranged in a predetermined order; and wherein the step of determining the actual entity from the plurality of possible entities further comprises comparing the user entity to a plurality of possible entities, further comprising:

(a) using a first subset of possible fulfilment entities as a comparison set of possible entities;

(b) calculating a similarity score between the user entity and each possible entity in the comparison set of possible entities;

(c) if the similarity score between the user entity and a possible entity in the comparison set of phrases exceeds a threshold, selecting the possible entity from the comparison set of response phrases having the best similarity score as compared to the request phrase; and (d) if the similarity score between the user entity and a possible entity in the comparison set of possible entities does not exceed the threshold, using the next set of possible entities as the comparison set of possible entities, and repeating steps (b)-(d).

16. The one or more non-transitory computer-readable storage media of claim 15, wherein the step of comparing the user entity to the plurality of possible entities further comprises:

prompting the user to provide an additional or a replacement user entity if a maximum similarity between the user entity and the plurality of possible entities is below a threshold.

17. The one or more non-transitory computer-readable storage media of claim 16, wherein the plurality of possible entities have a type, wherein the step of receiving configuration information further comprises receiving a plurality of previous actual entities associated with a plurality of previous user requests, wherein each of the previous actual entities has a type, and wherein the step of determining an actual entity from the plurality of possible entities further comprises:

detecting that the user entity is a pronoun, and selecting as the actual entity a most-recently used actual entity from the previous actual entities, where the selected actual entity has the same type as the type of the plurality of possible entities.

18. The one or more non-transitory computer-readable storage media of claim 15, wherein the step of comparing the user entity to a plurality of possible entities further comprises calculating a similarity score, wherein the similarity score is calculated using at least one of a first algorithm that respectively increases the similarity score if an initial portion of the user entity and each possible entity match, and a second algorithm that respectively increases the similarity score if a terminal portion of the user entity and each possible entity match.

19. The one or more non-transitory computer-readable storage media of claim 15, wherein the fulfillment includes one or more of: text, a multimedia object, or a reference to supplemental related content.

20. The one or more non-transitory computer-readable storage media of claim 15, wherein the step of receiving configuration information further comprises:

providing a graphical user interface to a configuring user, and     receiving, by the graphical user interface, an intent configuration comprising an example intent phrase, an entity category comprising the plurality of possible entities corresponding to the intent, a query of a data source containing information relevant to the intent, and a fulfillment of the intent comprising multimedia content retrieved from the data source.

21. The one or more non-transitory computer-readable storage media of claim 20, wherein the step of receiving, by the graphical user interface, the intent configuration further comprises receiving a reference to supplemental related content associated with the fulfillment.

\* \* \* \* \*